United States Patent
Lustig et al.

(10) Patent No.: US 12,498,344 B2
(45) Date of Patent: Dec. 16, 2025

(54) SENSING UNIT WITH FUNCTIONALIZED ELECTRODES

(71) Applicant: Baker Hughes Holdings LLC, Houston, TX (US)

(72) Inventors: James Michael Lustig, Newbury, OH (US); Andrew Walter Hutchinson, Richmond, VA (US)

(73) Assignee: Baker Hughes Holdings LLC, Houston, TX (US)

( * ) Notice: Subject to any disclaimer, the term of this patent is extended or adjusted under 35 U.S.C. 154(b) by 178 days.

(21) Appl. No.: 18/362,043

(22) Filed: Jul. 31, 2023

(65) Prior Publication Data
US 2024/0085364 A1    Mar. 14, 2024

Related U.S. Application Data

(60) Provisional application No. 63/405,211, filed on Sep. 9, 2022.

(51) Int. Cl.
G01N 27/403    (2006.01)

(52) U.S. Cl.
CPC .................. G01N 27/403 (2013.01)

(58) Field of Classification Search
CPC ............... G01N 27/403; G01N 27/026; G01N 33/2888; G01N 27/02
See application file for complete search history.

(56) References Cited

U.S. PATENT DOCUMENTS

2015/0081220 A1*  3/2015  Matsiev ................ G01N 27/02
                                                           702/7
2020/0319011 A1* 10/2020  Brewer ................. G01F 23/265

OTHER PUBLICATIONS

Xiaoliang Zhu et al: "A microsensor array for quantification of lubricant contaminants using a back propagation artificial neural network", J. Micromech. Microeng. 26 (2016) 065005 (10pp) (Year: 2016).*

Matthew F. Smiechowski et al, Iridium oxide sensors for acidity and basicity detection in industrial lubricants, Sensors and Actuators B 96 (2003) 261-267 (Year: 2003).*

* cited by examiner

Primary Examiner — Christopher E Mahoney
(74) Attorney, Agent, or Firm — Mintz, Levin, Cohn, Ferris, Glovsky and Popeo, P.C.

(57) ABSTRACT

A method for determining a health indicator parameter of a fluid are described. The method can include contacting at least one first functionalized electrode included in a plurality of functionalized electrodes of a sensing unit with a fluid. The method can also include generating a first electrical signal within the fluid by the at least one first functionalized electrode. The method can further include receiving, by at least one second functionalized electrode included in the plurality of functionalized electrodes of the sensing unit, a second electrical signal in response to the first electrical signal. The sensing unit can determine a health indicator parameter of the fluid based on the second electrical signal. The health indicator parameter can be associated with an electrochemical response signal included in the second electrical signal. The sensing unit can provide the health indicator parameter to a computing device communicably coupled to the sensing unit.

18 Claims, 3 Drawing Sheets

SENSING UNIT WITH FUNCTIONALIZED ELECTRODES

CROSS-REFERENCE TO RELATED APPLICATIONS

This application claims the benefit of and priority under 35 U.S.C. § 119 to U.S. Provisional Patent Application No. 63/405,211 filed Sep. 9, 2022, the entire contents of which is hereby expressly incorporated by reference herein.

BACKGROUND

In transportation and industrial applications, lubricants provide vital functions such as holding contaminants, protecting wear surfaces, dissipating heat, and other performance-enhancing features. During its life, a lubricant will undergo substantial chemical changes due to oxidative degradation and contamination by water, ethylene glycol, fuel, soot, and wear metals. It is desirable to monitor the condition of the lubricant to ensure that the lubricant is replaced or replenished before severe and permanent damage is sustained by the machine. Proper maintenance of the lubricant is a critical task for better equipment performance. A breakdown in the lubricant may lead to equipment failure and critical damage to the equipment. Presently, for checking the properties of a lubricant, routine sampling and laboratory testing are employed, thereby leading to a time-consuming and cumbersome process. Electrochemical impedance spectroscopy (EIS) measurements can be used for detecting changes in the properties of lubricating fluids. EIS can be utilized to monitor water contamination of lubricants, changes in viscosity, fuel contamination of engine oils, Total Acid Number (TAN), and Total Base Number (TBN) levels, as well as soot formation.

SUMMARY

In one aspect, an apparatus is provided. In one embodiment, the apparatus can include a sensing unit. The sensing unit can include a plurality of functionalized electrodes having one or more coatings. At least one first functionalized electrode can be configured to generate a first electrical signal at one or more intervals. The sensing unit can also include a power source configured to provide power to the plurality of functionalized electrodes. The sensing unit can include a control unit. The control unit can be configured to receive a second electrical signal from at least one second functionalized electrode of the plurality of functionalized electrodes generated in response to the first electrical signal. The control unit can determine a health indicator parameter of a fluid contacting the at least one second functionalized electrode based on the second electrical signal, the health indicator parameter associated with an electrochemical response signal included in the second electrical signal. The sensing unit can include a memory. The memory can store the first electrical signal, the second electrical signal, and the health indicator parameter. The sensing unit can also include a communication interface coupled to the memory. The communication interface can be configured to transmit the health indicator parameter to a computing device over a network.

In some embodiments, each functionalized electrode of the plurality of functionalized electrodes can include a different metal. In some embodiments, each functionalized electrode of the plurality of functionalized electrodes can have a different number of coatings. In some embodiments, the memory can be configured to store a range of predefined values of the second electrical signal associated with the health indicator parameter of the fluid, the received second electrical signal included in the range of predefined values. In some embodiments, the control unit can be configured to compare a value of the received second electrical signal with the range of predefined values of the second electrical signal associated with the health indicator parameter stored in the memory and can be further configured to generate an out-of-range signal when the received second electrical signal falls outside the stored range of the predefined values of the second electrical signal associated with the health indicator parameter.

In some embodiments, the health indicator parameter can be determined from a group consisting of a remaining useful life of the fluid, a viscosity of the fluid, a water contamination of the fluid, a fuel contamination of the fluid, an oxidation of the fluid, a nitration of the fluid, a presence of glycol in the fluid, a presence of soot in the fluid, a Total Base Number (TBN) of the fluid, a Total Acid Number (TAN) of the fluid, and a presence of wear particles in the fluid.

In another aspect, a system is provided. In one embodiment, the system can include a sensing unit. The sensing unit can include a plurality of functionalized electrodes having one or more coatings. At least one first functionalized electrode can be configured to generate a first electrical signal at one or more intervals. The sensing unit can also include a control unit. The control unit can be configured to receive a second electrical signal from at least one second functionalized electrode of the plurality of functionalized electrodes. The second electrical signal can be generated in response to the first electrical signal. The control unit can determine a health indicator parameter of a fluid contacting the at least one second functionalized electrode based on the second electrical signal, the electrochemical property associated with an electrochemical response signal included in the second electrical signal. The sensing unit can include a memory. The memory can store the first electrical signal, the second electrical signal, and the health indicator parameter. The sensing unit can include a communication interface coupled to the memory. The communication interface can be configured to transmit the health indicator parameter. The system can also include a computing device communicably coupled to the sensing unit. The computing device can be configured to receive the health indicator parameter from the sensing unit. The computing device can be configured to provide the health indicator parameter.

In some embodiments, each functionalized electrode of the plurality of functionalized electrodes can include a different metal. In some embodiments, each functionalized electrode of the plurality of functionalized electrodes can have a different number of coatings. In some embodiments, the memory can be configured to store a range of predefined values of the second electrical signal associated with the health indicator parameter of the fluid, the received second electrical signal included in the range of predefined values. In some embodiments, the control unit can be configured to compare a value of the received second electrical signal with the range of predefined values of the second electrical signal associated with the health indicator parameter stored in the memory and can be further configured to generate an out-of-range signal when the received second electrical signal falls outside the stored range of the predefined values of the second electrical signal associated with the health indicator parameter.

In some embodiments, the health indicator parameter can be determined from a group consisting of a remaining useful life of the fluid, a viscosity of the fluid, a water contamination of the fluid, a fuel contamination of the fluid, an oxidation of the fluid, a nitration of the fluid, a presence of glycol in the fluid, a presence of soot in the fluid, a Total Base Number (TBN) of the fluid, a Total Acid Number (TAN) of the fluid, and a presence of wear particles in the fluid.

In one aspect, a method is provided. In one embodiment, the method can include contacting at least one first functionalized electrode included in a plurality of functionalized electrodes of a sensing unit with a fluid. The method can also include generating a first electrical signal within the fluid by the at least one functionalized electrode. The method can further include receiving, by at least one second functionalized electrode included in the plurality of functionalized electrodes of the sensing unit, a second electrical signal in response to the first electrical signal. The sensing unit can determine a health indicator parameter of the fluid based on the second electrical signal. The health indicator parameter can be associated with an electrochemical response signal included in the second electrical signal. The sensing unit can provide the health indicator parameter to a computing device communicably coupled to the sensing unit.

In some embodiments, each functionalized electrode of the plurality of functionalized electrodes can include a different metal. In some embodiments, each functionalized electrode of the plurality of functionalized electrodes can have a different number of coatings. In some embodiments, the control unit can be configured to determine the health indicator of the parameter of the fluid by comparing the received second electrical signal to a range of predefined values of the second electrical signal associated with the health indicator parameter of the fluid stored in memory of the control unit. The received second electrical signal can be included in the range of predefined values. The control unit can be further configured to determine the health indicator of the parameter of the fluid based on the comparing. In some embodiments, responsive to the comparing a value of the received second electrical signal with the range of predefined values of the second electrical signal associated with the health indicator parameter stored in the memory, the control unit can be further configured to generate an out-of-range signal when the received second electrical signal falls outside the stored range of the predefined values of the second electrical signal associated with the health indicator parameter.

In some embodiments, the health indicator parameter can be determined from a group consisting of a remaining useful life of the fluid, a viscosity of the fluid, a water contamination of the fluid, a fuel contamination of the fluid, an oxidation of the fluid, a nitration of the fluid, a presence of glycol in the fluid, a presence of soot in the fluid, a Total Base Number (TBN) of the fluid, a Total Acid Number (TAN) of the fluid, and a presence of wear particles in the fluid.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

These and other features will be more readily understood from the following detailed description taken in conjunction with the accompanying drawings, in which.

It is noted that the drawings are not necessarily to scale. The drawings are intended to depict only typical aspects of the subject matter disclosed herein, and therefore should not be considered as limiting the scope of the disclosure.

DETAILED DESCRIPTION

For the proper functioning of various machines in industrial and transportation applications, lubricating fluid is used for the smooth operation of the machines. In addition to lubricating fluid, machines may use other fluids such as fuel, drive fluids, power steering fluids, power brake fluids, drilling fluids, oils, heat transfer fluids, or the like. The quality of the lubricating fluid deteriorates over time due to intended use of the machinery, mixing with contaminants and/or ageing of the lubricating fluid. Generally, certain additives are added to the lubricating fluid to increase the resilience of the lubricating fluid. However, these additives also break down over time and generate many acidic by-products. These acidic by-products are also mixed into the lubricating fluid and decrease the quality of the lubricating fluid gradually. It is desirable to monitor the condition of the lubricating fluid to ensure that the lubricating fluid is replaced or refilled timely to avoid any severe and permanent damage to the machine.

Presently, to determine the quality of the lubricating fluid, a sample of the fluid is collected and sent to a lab for analysis. The presently used techniques are time-consuming and inefficient, as the storing and transportation of the samples to the lab are prone to inaccurate results. To retrieve the analysis of the fluid in a less time-consuming way, several real-time oil quality and health monitoring systems have been introduced. In such systems, a plurality of separately configured sensors are employed, which can be configured to be in contact with the fluid and to sense the quality of the in-service fluid. However, these sensors are only able to sense a single parameter of the fluid, thereby providing a narrow view of the quality and/or health of the lubricating fluid. Also, Electrochemical impedance spectroscopy (EIS) is a method used to explore the chemical nature of the fluid. In EIS, changes to the complex impedance response is used to determine properties of the fluid such as the amount of water, fuel and/or soot in the lubricating fluid. EIS measurement is a powerful tool for detecting changes in the properties of the lubricating fluid. However, some property changes are more strongly signaled than others in conventional electrode setups.

The system described herein addresses the aforementioned shortcomings. For example, one or more embodiments of the system herein can include a sensing unit having a plurality of functionalized electrodes that can be configured to enable higher sensitivity to some property changes, such as changes to the total acid number (TAN) of the lubricating fluid, without diminishing the sensitivity to other properties.

The present system takes advantage of the surface chemistry of an electrode with the intent to improve selectivity for certain EIS measurements. The present disclosure provides a system including a single sensing unit that includes and integrates multiple, different types of electrodes to provide an improved sensing response over multiple parameters. In the present system, one or more coatings are applied to the electrodes such that the electrochemical signal response is enhanced with regard to a characteristic of the lubricating fluid. The sensing system herein that includes multiple sets of electrodes with different surface characteristics can be used to improve sensitivity to characteristics of interest as compared to a conventional device where all electrode surfaces are of the same composition.

The present system solves the problem by making the electrode surface more (or potentially less) reactive to certain artifacts or materials within the lubricating fluid. For example, applying an iridium oxide coating to an electrode can cause enhance potentiometric responses to changes in pH of the lubricating fluid and can selectivity respond to the presence of esters (a common lubricant decomposition product). The present system takes advantage of these observed phenomena to deliberately improve sensor response to certain parameter types. Improved sensor sensitivity would allow EIS to be useful for applications where EIS typically lacks sufficient sensitivity to be a practical measurement instrument. Examples include TAN and TBN, where EIS response can be used—but tends to provide a noisy signal or measurement of a % of water in a lubricating fluid, and existing systems can be limited to sensitivity of ~500 ppm, however, there is market demand to detect <100 ppm water.

Figure 1:
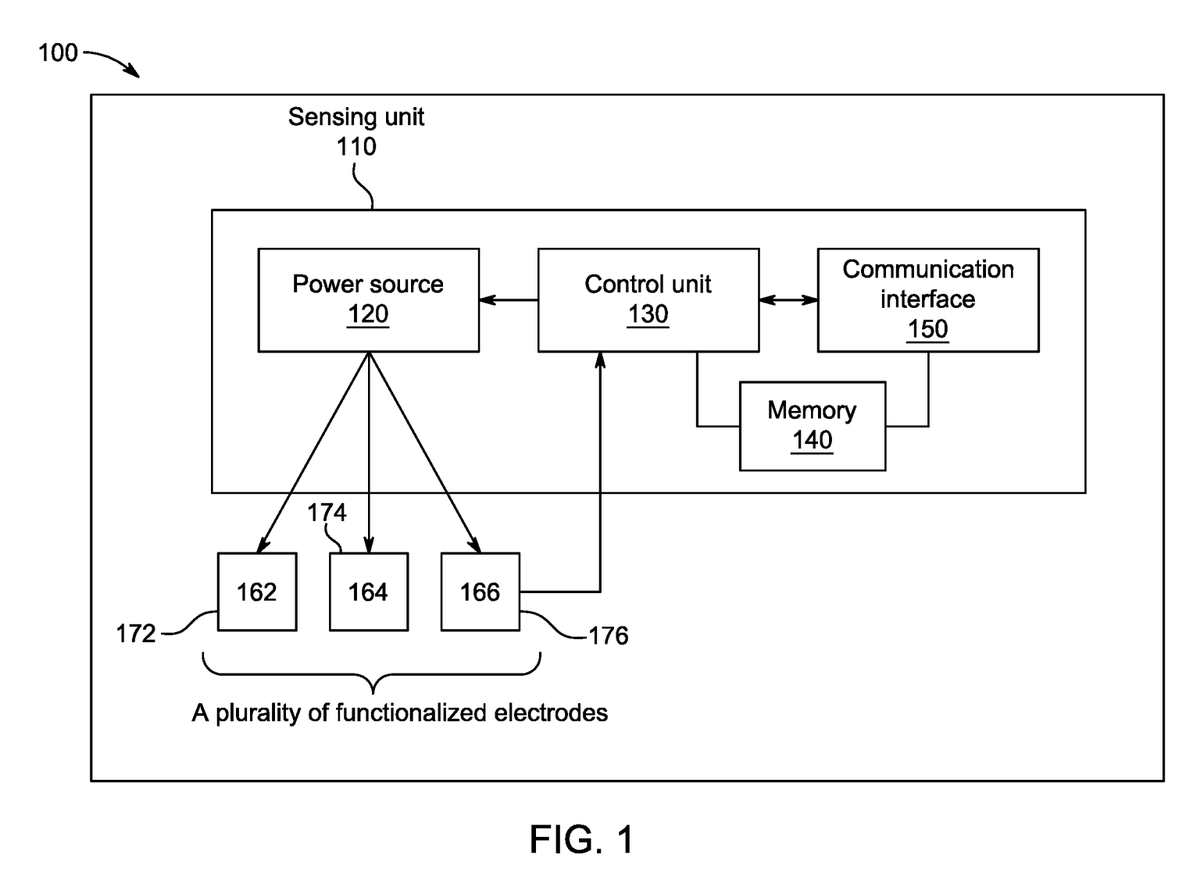
FIG. 1 is a diagram illustrating an exemplary embodiment of a fluid sensing apparatus.

FIG. 1 is a block diagram of an apparatus 100. The apparatus 100 includes a sensing unit 110. In some embodiments, the apparatus 100 can include a display (not shown in FIG. 1), and a connecting port (not shown in FIG. 1). The sensing unit 110 can include a power source 120, a control unit 130, a memory 140, a communication interface 150, and a plurality of functionalized electrodes 162, 164, 166. The sensing unit 110 can be in contact with a fluid to determine one or more properties or characteristics of the fluid. In some embodiments, the fluid may be engine oil. In some aspects, the sensing unit 110 contacts the fluid stored in a container. In some embodiments, the sensing unit 110 can be partially disposed in the fluid or fully immersed in the fluid. In an embodiment, the sensing unit 110 may be placed in a flow path through which the fluid is flowing. In some embodiments, the sensing unit 110 can include an electrochemical sensor. The electrochemical sensor can include an electrode that has been functionalized to determine or detect electrochemical properties of a fluid. In some embodiments, the sensing unit 110 can include other sensors, such as a capacitance sensor, a resistance sensor, a non-resonant impedance sensor, a resonant impedance sensor, an electromechanical resonance sensor (e.g., tuning fork, cantilever sensor, acoustic device sensor), a thermal sensor, an optical sensor, an acoustic sensor, a photoacoustic sensor, a near-infrared sensor, a ultraviolet sensor, an infrared sensor, a visible light sensor, fiber-optic sensor, and reflection sensor, a multivariable sensor, or a single-output sensor. In some embodiments, the sensing unit 110 can include a combination of an electrochemical sensor, such as one or more functional electrodes and one or more of the other sensors. For example, the sensing unit 110 can include a functionalized electrode and a temperature sensor. The temperature sensor can be configured to obtain temperature data of the fluid and to enable the system to compensate for impedance changes due to temperature. In this way, impedance changes due to temperature fluctuations can be distinguished from impedance changes due to the presence of contaminants in the fluid.

The power source 120 can provide power to the plurality of functionalized electrodes 162, 164, 166. In an embodiment, the power source 120 can be selected from a group including a lead-acid battery, a lithium-ion battery, and a nickel-metal-hydride battery. In some embodiments, the power source 120 can be a rechargeable battery.

Each functionalized electrode of the plurality of functionalized electrodes 162, 164, 166 can generate a first electrical signal at one or more intervals. Each functionalized electrode 162, 164, 166 can have a coating. In an example, a first functionalized electrode 162 has a single coating 172. In some embodiments, each of the functionalized electrodes 162, 164, 166 is made of a different conductor or conductive material. In some embodiments, the conductor or conductive material can include gold or stainless steel. In some examples, each of the functionalized electrodes can have a different coating or the same coating. In some embodiments, the coating material can include iridium oxide, lithium, or platinum.

As described herein, a coating can include any form of surface conditioning necessary or configured to "functionalize" the surface of the electrode such that an enhanced electrochemical signal response is produced when contacted with a fluid property of interest. The coatings can cause the surface of the functionalized electrodes 162, 164, 166 to be more (or potentially less) electrochemically reactive to electrical input or response signals associated with certain species, particles, or artifacts within the fluid. In some embodiments, the fluid can emanate electrochemical signals in response to the generated first electrical signal. For example, a functionalized electrode including a lithium coating can provide additional reaction sited for oxidized oil compounds. As a result, the functionalized electrode can exhibit greater sensitivity for changes in oil oxidation and TAN. In other example, functionalized electrodes that include a platinum coating can catalyze reactions with water. As a result, platinum coated functionalized electrodes can improve detection of electrochemical input or response signals indicative of a percentage of water that may be present in a fluid.

The generated electrochemical signals from the fluid are received by the sensing unit as a second electrical signal from the plurality of functionalized electrodes 162, 164, 166. The second electrical signal indicates the characteristics of the fluid. For example, if water is present in the fluid, the generated second electrical signal is different, and if acidic additives are present in the fluid, then the generated second electrical signal are further different.

The control unit 130 can receive the second electrical signal from the plurality of functionalized electrodes generated in response to the first electrical signal. Further, the control unit 130 can determine an electrochemical property of the fluid contacting at least one functionalized electrode based on the received second electrical signal. For example, the electrochemical property of the fluid is associated with at least one characteristic of the fluid. The at least one characteristic can include a remaining useful life of the fluid, a viscosity of the fluid, a water contamination of the fluid, a fuel contamination of the fluid, an oxidation of the fluid, a nitration of the fluid, a presence of glycol in the fluid, a presence of soot in the fluid, a Total Base Number (TBN) of the fluid, a Total Acid Number (TAN) of the fluid, and a presence of wear particles in the fluid. The control unit 130 includes one or more processors for analyzing the received second electrical signal. For example, the control unit 130 can cooperate with the memory 140 to receive and execute the set of program instructions for processing the received signals. The received signals can include different electrical signals received from the different functionalized electrodes. With multiple electrode pairs being utilized, each separate electrode pairing could have both different input and response electrical signals. The control unit 130 may be implemented as one or more microprocessors, microcomputers, digital signal processors, central processing units, state machines, logic circuitries, and/or any devices that manipulate signals based on program instructions. The instructions on which the control unit 130 operates may be stored on a tangible and non-transitory computer-readable storage medium, such as the memory 140.

The memory 140 is configured to store the first electrical signal, the second electrical signal, and the determined electrochemical property of the fluid. The input signal can be a frequency applied at a given amplitude/voltage. In some embodiments, a DC voltage bias can also be applied to this signal. Voltage can be applied in the range of ±1 V. Higher voltages are generally not used so that electrochemical reactions are not stimulated at the electrodes. The response can be measured as either a voltage or a current. In some embodiments, the magnitude and the phase shift of the response can be measured. Measurements can be taken at multiple frequencies, such as those in the range of 0.08 Hz to 100 kHz, although additional frequency ranges can be envisioned.

The memory 140 also stores a set or a range of predefined values corresponding to each second electrical signal that can be associated with an electrochemical property of the fluid. The received second electrical signal is included in the range of predefined values. In some embodiment, the memory 140 is configured to store a set of rules for processing the received signals. In one embodiment, the memory may include any computer-readable storage medium known in the art including, for example, volatile memory, such as Static Random Access Memory (SRAM) and Dynamic Random Access Memory (DRAM), and/or a non-volatile memory, such as Read Only Memory (ROM), erasable programmable ROM, flash memories, hard disks, optical disks, and magnetic tapes.

The communication interface 150 is commutatively coupled to the memory 140 and fetches the stored data (determined electrochemical property) from the memory 140. Further, the communication interface 150 transmits the determined electrochemical property to a computing device over a network. In some embodiments, the communication interface 150 may include at least one antenna for transmitting and receiving signals. The computing device and the apparatus 100 may be configured to communicate with each other over a wireless network or a wired network.

The control unit 130 is configured to compare a value of the received second electrical signal with the range of predefined values of the second electrical signal associated with the electrochemical property stored in the memory 140. The control unit 130 is further configured to generate an out-of-range signal when the received second electrical signal falls outside the stored range of the predefined values of the second electrical signal associated with the electrochemical property.

Figure 2:
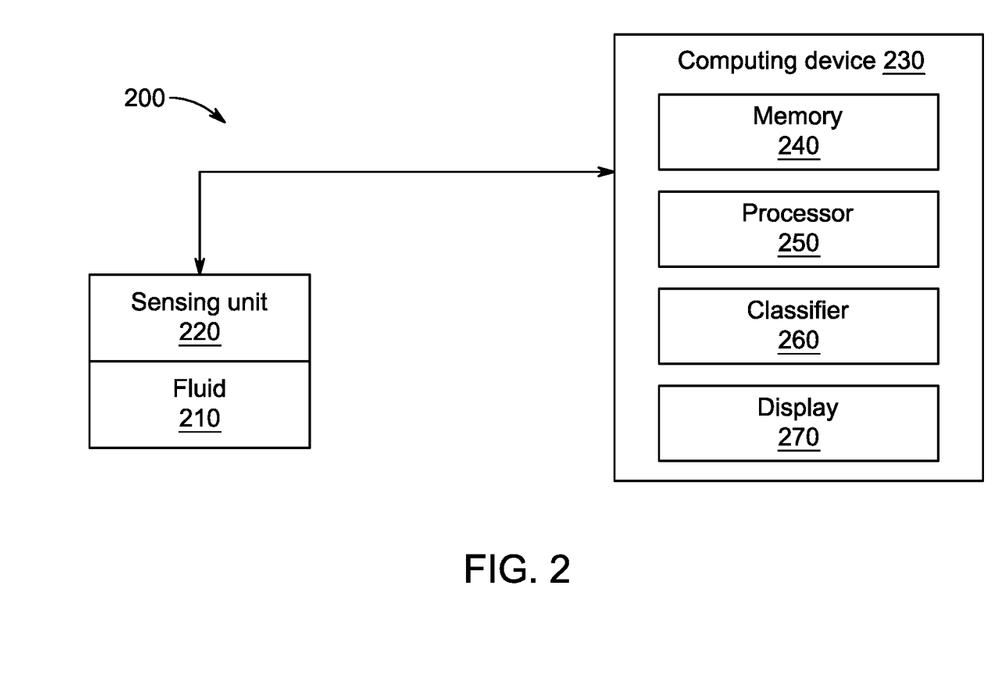
FIG. 2 is a diagram illustrating another exemplary embodiment of a fluid sensing system.

FIG. 2 is a block diagram of a fluid sensing system 200. The system 200 includes a fluid 210, a sensing unit 220, and a computing device 230. In an operative embodiment, the sensing unit 220 can be in contact with the fluid 210. In some embodiments, the fluid 210 is included in a container used for storing the fluid 210 or flowing past the sensing unit 220 such that the fluid within the sensing unit 220 can be a homogenously representative sample of a larger volume of the fluid.

The sensing unit 220 includes a power source, a control unit, a memory, a communications circuitry, and a plurality of functionalized electrodes. The construction of the sensing unit 220 is substantially similar to that of the sensing unit 110 of FIG. 1.

The plurality of functionalized electrodes can generate a first electrical signal at one or more intervals. The first electrical signal can include an input signal and the input signal can vary with respect to amplitude and waveform. Each of the functionalized electrodes of the plurality of functionalized electrodes includes a different coating. In some embodiments, each of the functionalized electrodes is made of a different metal. In some examples, each of the functionalized electrodes has a different number of coatings. The different type of coatings or different number of coatings can cause the surface of the functionalized electrodes to be more (or potentially less) reactive to certain species, particles, or artifacts within the fluid. In response to the first electrical signal, a second electrical signal is generated in the fluid and can be received at the functionalized electrodes 162, 164, 166. The second electrical signal indicates the characteristics of the fluid. The second electrical signal can include an output signal that can correspond to the input signal associated with the first electrical signal. The second electrical signal is compared to the first electrical signal, such that the output signal is compared to the input signal, and thus the output signal is not used in isolation or alone for processing. The control unit can receive the second electrical signal generated in the fluid due to the first electrical signal and can determine an electrochemical property of the fluid contacting at least one functionalized electrode based on the second electrical signal. Further, the control unit is configured to receive commands from a remotely placed computing device 230. On receiving the commands from the computing device 230, the control unit generates at least one control signal. The memory is configured to store the first electrical signal, the second electrical signal, and the determined electrochemical property. The communication interface is coupled to the memory and configured to transmit the determined electrochemical property towards the computing device 230.

The computing device 230 is communicably coupled to the sensing unit 220 and is configured to receive determined electrochemical property from the sensing unit 220. The computing device 230 can determine at least one characteristic of the fluid based on the received determined electrochemical property.

The computing device 230 includes a memory 240, a processor 250, a classifier 260, and a display 270. The memory 240 stores data, such as a set or range of predefined values, corresponding to each characteristic of the fluid. In some embodiment, the memory 240 is configured to store a set of rules for processing the received signals. In one embodiment, the memory may include any computer-readable storage medium known in the art including, for example, volatile memory, such as Static Random Access Memory (SRAM) and Dynamic Random Access Memory (DRAM), and/or a non-volatile memory, such as Read Only Memory (ROM), erasable programmable ROM, flash memories, hard disks, optical disks, and magnetic tapes.

The processor 250 is configured to compare a value of the determined characteristic of the fluid with the stored set or range of predefined values corresponding to the determined characteristic of the fluid fetched from the memory 240. The processor 250 can also evaluate multiple types of measurement data to generate fluid characteristics. The processor 250 can perform preprocessing of the measurement data to correct for temperature compensation. The measurement data can include electrochemical signal data, temperature data, and other sensor data (e.g. J-1939 engine data which could include things like oil pressure data, engine RPM data, coolant temperature data, or the like). In some embodiments, multiple measurement data values can be associated with a signal corresponding to a fluid characteristic. Advantageously, different functionalized electrodes as described herein can provide additional measurement data. For example, a first set of measurement data, XA, could be electrical signal data from one electrode set, a second set of measurement data, XB, could be electrical signal data from a second electrode set, and a third set of measurement data, XC, could be temperature data. Accordingly, the processor 250 can determine that YA corresponds to water output data, YB corresponds to viscosity data, and the like. The processor 250 can generate the first set of fluid characteristic data (e.g., YA(1), YB(1) . . . ) based on multiple measurement data points used to generate that Y data (e.g., XA(1) to XA(100); XB(1) to XB(100); and/or XC(1) to XC(12)). The processor 250 is further configured to generate an alert signal, such as an out-of-range signal, when the determined value falls outside the stored range of the determined electrochemical property that can be associated with a characteristic of the fluid. The classifier 260 can classify the determined characteristic of the fluid into different sets based upon a relationship of the determined characteristics of the fluid. The classifier 260 is able to classify the characteristics based on the severity of the changes, relationship between the characteristics, and historic (previously determined data). In some embodiment, the classifier 260 can generate classified data. The display 270 can display the classified data. In some embodiment, the classified data includes electrochemical signal data that has been assigned (or is classified using) fluid characteristic information. Thus, electrochemical signal data can be used to generate classification data. For example, discontinuities in the electrochemical signal data can be used to identify (or classify) an oil change, such as a change in properties of oil or the need to change oil in a machinery. In this way, external sources of classification data are not required to generate classification data.

In some embodiment, the at least one characteristic is selected from a group consisting of a remaining useful life of the fluid, a viscosity of the fluid, a water contamination of the fluid, a fuel contamination of the fluid, an oxidation of the fluid, a nitration of the fluid, a presence of glycol in the fluid, a presence of soot in the fluid, a Total Base Number (TBN) of the fluid, a Total Acid Number (TAN) of the fluid, and a presence of wear particles in the fluid.

Figure 3:
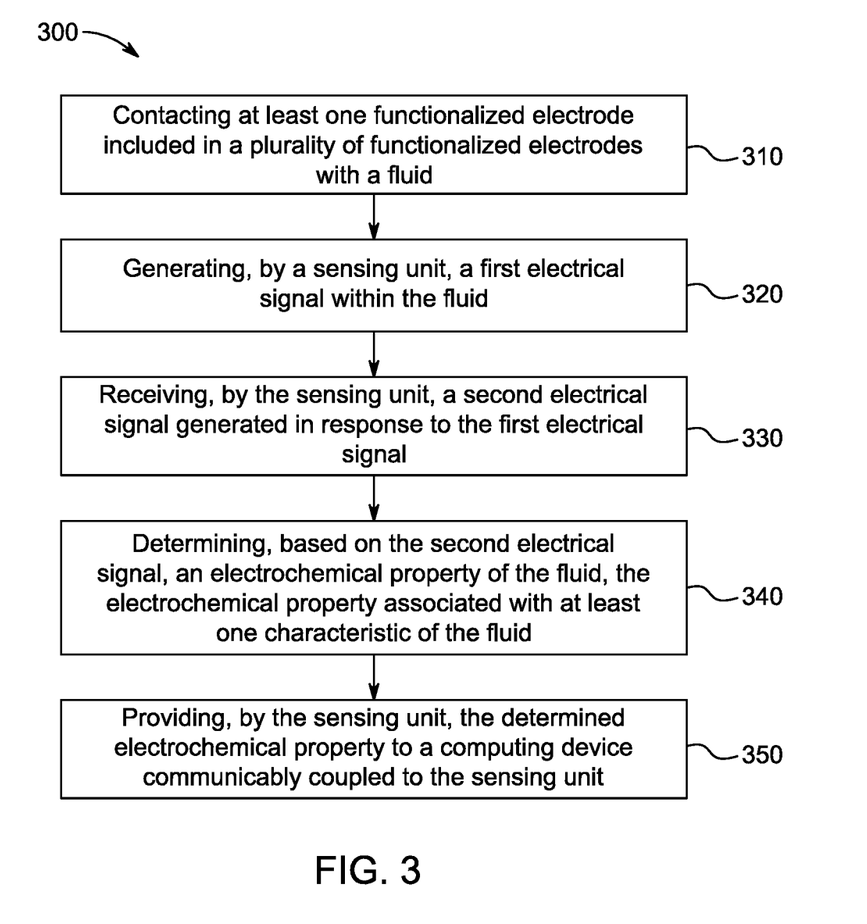
FIG. 3 is a flowchart illustrating one exemplary embodiment of a method for determining changes in the characteristics of the fluid using the apparatus and system of FIG. 1-FIG. 2.

FIG. 3 is a process flow diagram illustrating an example method 300 for determining changes in at least one characteristic of a fluid. The method 300 can be performed by one or more components of the system of FIG. 2. In the method 300, one or more coatings is applied to a plurality of electrodes such that the electrochemical response signal is enhanced with regard to the parameter of interest.

At 310, at least one functionalized electrode included in a plurality of functionalized electrodes can be contacted with the fluid. In some embodiments, a container can store the fluid for which characteristics are determined. A plurality of functionalized electrodes that have been functionalized in different ways to enhance different properties of the fluid can be used in a single sensor device.

At 320, a first electrical signal is generated by a sensing unit within the fluid. In some embodiments, the fluid can emanate electrochemical (response) signals in response to the generated first electrical signal. In an aspect, the electrochemical signals emanating from the fluid are different based on a number of facts such as age of the fluid, amount of an additive present in the fluid, and amount of water in the fluid. A sensor can send complex impedance wave-form data, such as ZReal and ZImaginary data, along with frequency data and temperature data to a computing device. The computing device then process the received data holistically—taking the data collected at multiple frequencies to determine correlations with health indicating parameters of interest (% water, % fuel, TAN, TBN, or the like). Modifying the surface of the electrodes in this way can enhance the signal response to a changing health parameter, such as changes in a % of water or changes in a % of fuel.

The different functionalized electrodes can provide different electrical signal responses to a given electrical signal input. A range of input signals can be used (e.g., a range of input frequencies can be applied). Depending on the type of functionalization of the electrode, the response signals can be very similar between electrodes at some frequencies, but dissimilar at other frequencies. The enhanced signal response in a given functionalized electrode for certain given input signal is then able to be used by the compute unit or a computing device for improved measurement sensitivity/accuracy over impedance spectroscopy methods that are not utilizing functionalized electrodes.

At 330, the generated electrochemical signals from the fluid are received by the sensing unit as second electrical signals from the plurality of functionalized electrodes.

At 340, the sensing unit determines an electrochemical property of the fluid based on the second electrical signals. The electrochemical property of the fluid can be associated with at least one characteristic of the fluid.

At 350, the sensing unit can provide the determined electrochemical property to a computing device communicatively coupled to the sensing unit. In some embodiments, the computing device can store historic data received from the sensing unit and analysis of the electrochemical properties and the characteristics of the fluid can be performed.

The subject matter described herein can provide many technical advantages. For example, it can facilitate a fluid sensing system with a plurality of electrodes with different surface characteristics and improves sensitivity to parameters of interest as compared to a conventional system where all electrode surfaces are made of the same composition.

Certain exemplary embodiments have been described to provide an overall understanding of the principles of the structure, function, manufacture, and use of the systems, devices, and methods disclosed herein. One or more examples of these embodiments have been illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment can be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

Approximating language, as used herein throughout the specification and claims, can be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language can correspond to the precision of an instrument for measuring the value. Here and throughout the specification and claims, range limitations can be combined and/or interchanged, such ranges are identified and include all the sub-ranges contained therein unless context or language indicates otherwise.

One skilled in the art will appreciate further features and advantages of the invention based on the above-described embodiments. Accordingly, the present application is not to be limited by what has been particularly shown and described, except as indicated by the appended claims. All publications and references cited herein are expressly incorporated by reference in their entirety.

The invention claimed is:

1. An apparatus comprising:
   a sensing unit comprising:
      a plurality of functionalized electrodes having one or more coatings, at least one first functionalized electrode configured to generate a first electrical signal at one or more intervals;
      a power source configured to provide power to the plurality of functionalized electrodes;
      a control unit configured to:
         receive a second electrical signal from at least one second functionalized electrode of the plurality of functionalized electrodes generated in response to the first electrical signal, and
         determine a health indicator parameter of a lubricating fluid contacting the at least one second functionalized electrode based on the second electrical signal, the health indicator parameter associated with an electrochemical response signal included in the second electrical signal, the health indicator parameter being indicative of a decomposition of a component of the lubricating fluid;
      a memory storing the first electrical signal, the second electrical signal, and the health indicator parameter; and
      a communication interface coupled to the memory and configured to transmit the health indicator parameter to a computing device over a network.

2. The apparatus of claim 1, wherein each functionalized electrode of the plurality of functionalized electrodes includes a different metal.

3. The apparatus of claim 1, wherein each functionalized electrode of the plurality of functionalized electrodes has a different number of coatings.

4. The apparatus of claim 1, wherein the memory is configured to store a range of predefined values of the second electrical signal associated with the health indicator parameter of the fluid, the received second electrical signal included in the range of predefined values.

5. The apparatus of claim 4, wherein the control unit is configured to compare a value of the received second electrical signal with the range of predefined values of the second electrical signal associated with the health indicator parameter stored in the memory and further configured to generate an out-of-range signal when the received second electrical signal falls outside the stored range of the predefined values of the second electrical signal associated with the health indicator parameter.

6. The apparatus of claim 1, wherein the health indicator parameter is determined from a group consisting of a remaining useful life of the fluid, a viscosity of the fluid, a water contamination of the fluid, a fuel contamination of the fluid, an oxidation of the fluid, a nitration of the fluid, a presence of glycol in the fluid, a presence of soot in the fluid, a Total Base Number (TBN) of the fluid, a Total Acid Number (TAN) of the fluid, and a presence of wear particles in the fluid.

7. A system comprising:
   a sensing unit comprising:
      a plurality of functionalized electrodes having one or more coatings, at least one first functionalized electrode configured to generate a first electrical signal at one or more intervals;
      a control unit configured to:
         receive a second electrical signal from at least one second functionalized electrode of the plurality of functionalized electrodes, the second electrical signal generated in response to the first electrical signal, and
         determine a health indicator parameter of a lubricating fluid contacting the at least one second functionalized electrode based on the second electrical signal, the health indicator parameter associated with an electrochemical response signal included in the second electrical signal, the health indicator parameter being indicative of a decomposition of a component of the lubricating fluid;
      a memory storing the first electrical signal, the second electrical signal, and the health indicator parameter; and
      a communication interface coupled to the memory and configured to transmit the health indicator parameter; and
   a computing device communicably coupled to the sensing unit, the computing device configured to
      receive the health indicator parameter from the sensing unit, and
      provide the health indicator parameter.

8. The system of claim 7, wherein each functionalized electrode of the plurality of functionalized electrodes includes a different coating.

9. The system of claim 7, wherein each functionalized electrode of the plurality of functionalized electrodes includes a different metal.

10. The system of claim 7, wherein the memory is configured to store a range of predefined values of the second electrical signal associated with the health indicator parameter of the fluid, the received second electrical signal included in the range of predefined values.

11. The system of claim 10, wherein the control unit is configured to compare a value of the received second electrical signal with the range of predefined values of the second electrical signal associated with the health indicator parameter stored in the memory and further configured to generate an out-of-range signal when the received second electrical signal falls outside the stored range of the predefined values of the second electrical signal associated with the health indicator parameter.

12. The system of claim 7, wherein the health indicator parameter is determined from a group consisting of a remaining useful life of the fluid, a viscosity of the fluid, a water contamination of the fluid, a fuel contamination of the fluid, an oxidation of the fluid, a nitration of the fluid, a presence of glycol in the fluid, a presence of soot in the fluid, a Total Base Number (TBN) of the fluid, a Total Acid Number (TAN) of the fluid, and a presence of wear particles in the fluid.

13. A method comprising:
   contacting at least one first functionalized electrode included in a plurality of functionalized electrodes of a sensing unit with a lubricating fluid;
   generating, by the at least one functionalized electrode, a first electrical signal within the fluid;
   receiving, by at least one second functionalized electrode included in the plurality of functionalized electrodes of the sensing unit, a second electrical signal in response to the first electrical signal;
   determining, by a control unit of the sensing unit, a health indicator parameter of the lubricating fluid based on the second electrical signal, the health indicator parameter associated with an electrochemical response signal included in the second electrical signal, the health indicator parameter being indicative of a decomposition of a component of the lubricating fluid; and
   providing, by the sensing unit, the health indicator parameter to a computing device communicably coupled to the sensing unit.

14. The method of claim 13, wherein each functionalized electrode of the plurality of functionalized electrodes includes a different metal.

15. The method of claim 13, wherein each functionalized electrode of the plurality of functionalized electrodes has a different number of coatings.

16. The method of claim 13, wherein the control unit is configured to determine the health indicator of the parameter of the fluid by comparing the received second electrical signal to a range of predefined values of the second electrical signal associated with the health indicator parameter of the fluid stored in memory of the control unit, the received second electrical signal included in the range of predefined values, and determining the health indicator of the parameter of the fluid based on the comparing.

17. The method of claim 16, wherein responsive to the comparing a value of the received second electrical signal with the range of predefined values of the second electrical signal associated with the health indicator parameter stored in the memory, the control unit is further configured to generate an out-of-range signal when the received second electrical signal falls outside the stored range of the predefined values of the second electrical signal associated with the health indicator parameter.

18. The method of claim 13, wherein the health indicator parameter is determined from a group consisting of a remaining useful life of the fluid, a viscosity of the fluid, a water contamination of the fluid, a fuel contamination of the fluid, an oxidation of the fluid, a nitration of the fluid, a presence of glycol in the fluid, a presence of soot in the fluid, a Total Base Number (TBN) of the fluid, a Total Acid Number (TAN) of the fluid, and a presence of wear particles in the fluid.

* * * * *